United States Patent [19]
Barrand

[11] Patent Number: 5,445,540
[45] Date of Patent: Aug. 29, 1995

[54] ATTACHMENT MEMBER FOR LAMP SOCKET AND METHOD

[75] Inventor: Kerwood Barrand, Vienna, Va.

[73] Assignee: Vision Lighting, Inc., Rockville, Md.

[21] Appl. No.: 253,241

[22] Filed: May 31, 1994

[51] Int. Cl.[6] ............................................. H01R 13/73
[52] U.S. Cl. .................................. 439/573; 439/929; 248/176; 362/221
[58] Field of Search ....................... 439/571, 573, 929; 362/216, 221, 260; 248/176, 309.1

[56] References Cited

U.S. PATENT DOCUMENTS 4,713,019  12/1987  Gaynor ............................ 439/232

FOREIGN PATENT DOCUMENTS 1042844  9/1966  United Kingdom ................ 439/571

*Primary Examiner*—Gary E. Paumen
*Attorney, Agent, or Firm*—Oliff & Berridge

[57] ABSTRACT

An attachment member attachable to an existing compact fluorescent lamp socket includes a pair of sidewalls and an endwall defining an inclined surface. A pair of placement apertures are engageable with corresponding engagement apertures in an attachment surface of the compact fluorescent lamp socket. Additionally, the attachment member includes a pair of placement posts corresponding to second fixture engagement apertures in the attachment surface of the compact fluorescent lamp socket. The attachment member efficiently spaces a compact fluorescent lamp from the ballast relative to a plane parallel to the fixture engaging surface of the attachment member, thereby maximizing the illumination potential of the light fixture.

16 Claims, 4 Drawing Sheets

ATTACHMENT MEMBER FOR LAMP SOCKET AND METHOD

BACKGROUND OF THE INVENTION

The present invention relates to sockets for compact fluorescent lamps, and more particularly, to an attachment member attachable to a compact fluorescent lamp socket that improves the illumination from a compact fluorescent lamp fixture.

In an effort to minimize electricity usage, compact fluorescent lamps are rapidly gaining popularity over incandescent lamps as they provide an equivalent amount of light while requiring less than one-third the power and achieving ten times greater service life. In addition, the incandescent fixtures are readily convertible to a similar size compact fluorescent lamp fixture. In a compact fluorescent light, the electrical connection is made at a single base rather than at opposite ends of the common fluorescent tube. As a result, compact fluorescent lamps are easily applicable to space-saving lighting fixtures, ergonometric desk lamps, explosion proof globes and other single-end access fixtures formerly requiring incandescent lamps.

Referring to FIG. 2, the arrangement of a typical round two-lamp fixture is illustrated. The fixture includes a pair of compact fluorescent lamps 10, each inserted in a lamp socket 12. Each lamp is electrically coupled to a ballast 14 through wires 15 for controlling output power to the lamps 10. A fixture hole 16 is formed in the center of the fixture for mounting.

Referring to FIG. 1, in the conventional arrangement, the fluorescent lamp 10 and socket 12 are substantially horizontally configured. The lamp 10 is therefore generally maintained at a level relative to the fixture that is coincident with the ballast 14. A problem arises in the conventional arrangement in that a significant amount of the illumination from lamp 10 is absorbed by the ballast 14 and wires 15. As a result, the expected level of illumination is decreased, and the ballast and wires in the fixture may be visible from of the fixture when the lamp is on. In addition, the proximity of the lamp to the ballast and wires deters heat dissipation, and the resulting use of the lamp fixture in higher temperature conditions shortens the life of the lamp.

SUMMARY OF THE INVENTION

Accordingly, it is an object of the invention to modify the existing compact fluorescent lamp socket to overcome the above-described problems in the conventional apparatus.

It is another object of the invention to provide an attachment member attachable to an existing compact fluorescent lamp socket that maximizes the illumination capabilities of the compact fluorescent lamp.

It is still another object of the invention to provide an attachment member attachable to an existing compact fluorescent lamp socket that efficiently spaces the fluorescent lamp from the ballast such that the amount of light absorbed by the ballast is minimized.

These and other objects are achieved by providing an attachment member attachable to a compact fluorescent lamp socket housing a compact fluorescent lamp. The attachment member includes a fixture engaging surface and an inclined surface engageable with an attachment surface of the compact fluorescent lamp socket. The inclined surface is inclined at an angle such that at least a portion of the compact fluorescent lamp is spaced from the ballast relative to a plane parallel to the fixture engaging surface when the attachment member is attached to the compact fluorescent lamp socket. The attachment surface of the compact fluorescent lamp socket may include at least one first fixture engagement aperture adapted to receive a first fixing device for fixing the compact fluorescent lamp socket to a fixture and may include a corresponding at least one placement aperture adapted to receive the fixing device.

The attachment surface of the compact fluorescent lamp socket may further include at least one second fixture engagement aperture adapted to receive a second fixing device for fixing the compact fluorescent lamp socket to the fixture, and a corresponding at least one placement shaft engageable with the at least one second fixture engagement aperture.

The attachment member includes a first end at a beginning of the inclined surface and a second end at an end of the inclined surface, wherein the at least one placement aperture is disposed adjacent the first end, and the at least one placement shaft is disposed adjacent the second end. The at least one placement aperture may be delimited by a ridge extending in a plane substantially parallel to the inclined surface.

The attachment member may further include a pair of sidewalls defining the inclined surface and an endwall disposed substantially perpendicular to the sidewalls.

In another aspect of the invention, there is provided a light fixture including a main surface supporting a ballast and a lamp socket. The lamp socket includes an attachment member disposed between the main surface and the lamp socket including a fixture engaging surface engageable with the fixture and an inclined surface engageable with an attachment surface of the lamp socket. The inclined surface is inclined at an angle such that at least a portion of the compact fluorescent lamp is spaced from the ballast relative to a plane parallel to the fixture engaging surface. The attachment surface of the lamp socket may include at least one first fixture engagement aperture adapted to receive a first fixing device for fixing the lamp socket to the main surface of the fixture, and a corresponding at least one placement aperture aligned with the at least one first fixture engagement aperture and adapted to receive the fixing device. The attachment member may be molded to the lamp socket or integral with the lamp socket.

In yet another aspect of the invention, there is provided a method of improving illumination from a lamp fixture including a ballast coupled to a lamp socket housing a lamp. The method includes the step of fixing the lamp socket to the lamp fixture on an incline such that at least a portion of the lamp is spaced from the ballast relative to a plane parallel to the fixture. The fixing step may include the step of providing an inclined attachment member between the lamp socket and the fixture.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

Figure 1:
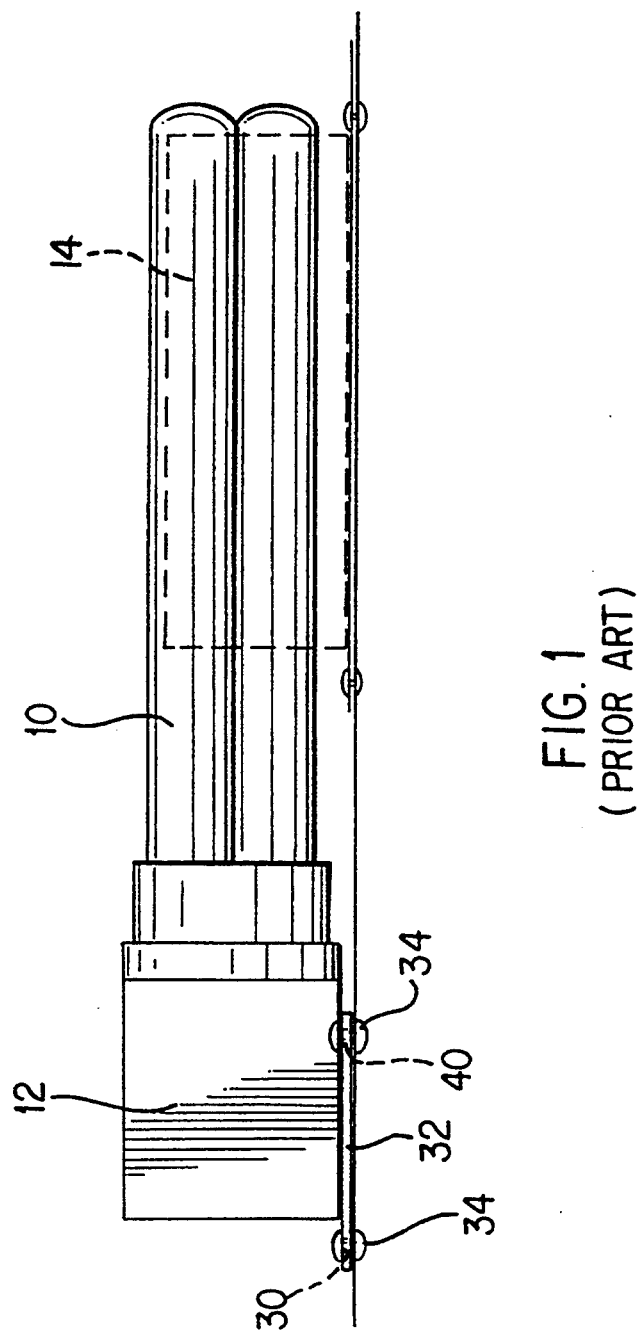
FIG. 1 is a side view of a conventional compact fluorescent lamp fixture.
Figure 2:
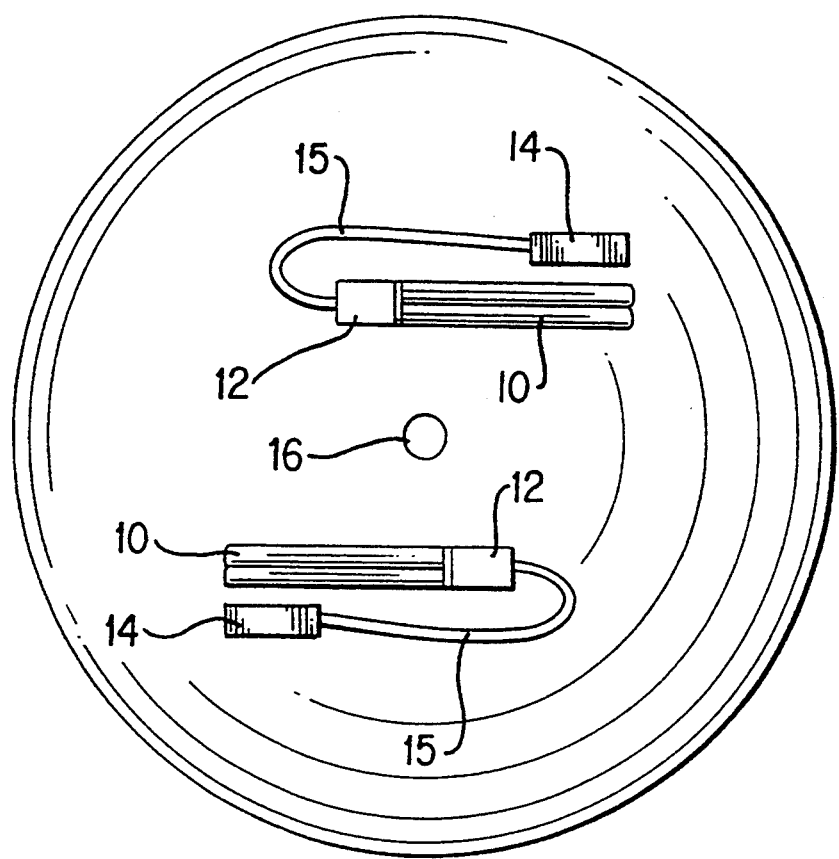
FIG. 2 is a plan view of a light fixture arrangement using compact fluorescent lamps.
Figure 4:
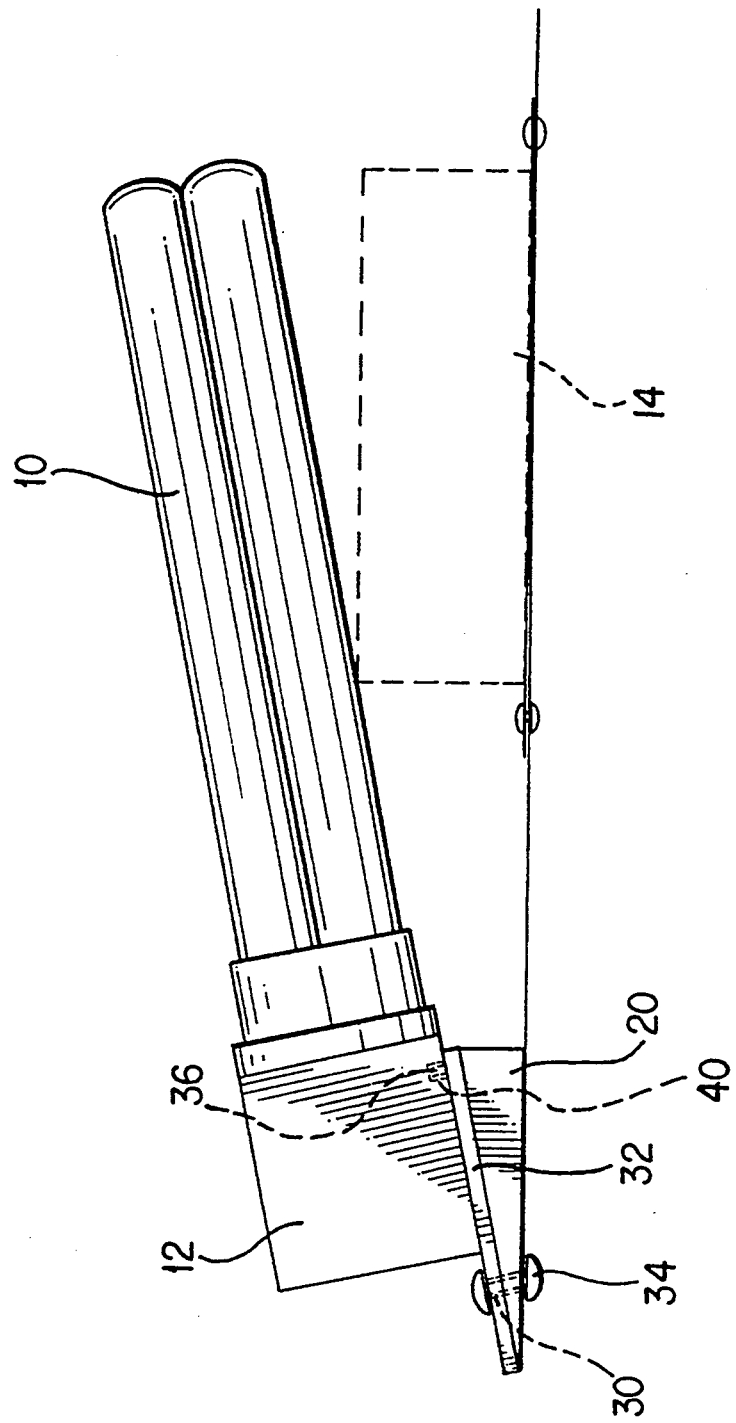
FIG. 4 is a side view showing the attachment member of the present invention in a light fixture.

Referring to Figures 1 and 4, a compact fluorescent lamp socket 12 includes an attachment surface 32 having two pairs of fixture engagement apertures 30,40, respectively. In the conventional apparatus, the fixture engagement apertures 30,40 are adapted to receive suitable fixing means 34 such as rivets or screws for securing the socket 12 to the fixture. Although the figures illustrate one particular compact fluorescent lamp socket, the invention is not meant to be limited thereto. One such socket is provided in U.S. Pat. No. 4,713,019 to Gaynor, the disclosure of which is hereby incorporated by reference.

Figure 3:
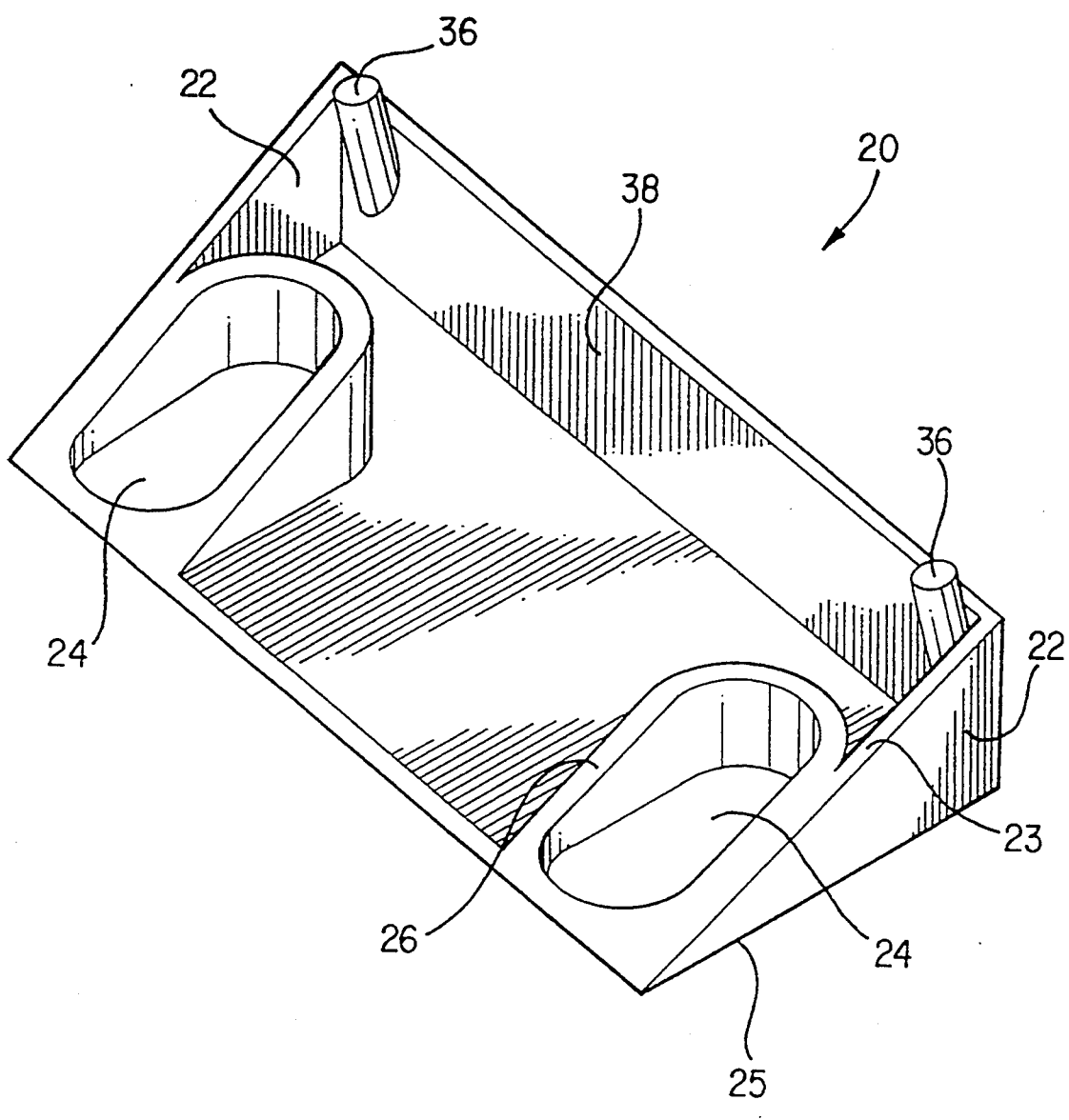
FIG. 3 is a perspective view of the attachment member of the present invention.

Referring to FIG. 3, an attachment member 20 for an existing compact fluorescent lamp socket 12 includes a pair of inclined sidewalls 22 forming an inclined surface 23. Adjacent each sidewall 22 of the attachment member 20 is an oblong placement aperture 24. Each placement aperture 24 includes a ridge 26 having an upper surface that is inclined in parallel with the inclined surface of the sidewalls 22 delimiting the placement apertures 24. The placement apertures 24 are configured to directly correspond to a pair of first fixture engagement apertures 30 formed in the attachment surface 32 of the fluorescent lamp socket 12. A suitable fixing member 34 such as rivets or screws secures the attachment member between the socket 12 and the light fixture. Alternatively, the attachment member 20 can be snapped or molded directly to the socket 12.

At an opposite end of the inclined surface from the placement apertures 24 are disposed a corresponding pair of placement posts 36 that are formed integral with an endwall 38 of the attachment member 20. The placement posts 36 preferably extend above the endwall 38 and are disposed perpendicular to a plane defined by the inclined surface 23. The placement posts 36 are configured to engage the pair of corresponding second fixture engagement apertures 40 in the fluorescent lamp socket 12. The placement posts 36 facilitate the attaching of the attachment member 20 to the compact fluorescent lamp socket.

A lower surface of the attachment member 20 defines a fixture engaging surface 25 for engagement with the light fixture. As illustrated in FIG. 4, when the attachment member 20 of the present invention is disposed between an existing compact fluorescent lamp socket 12 and the light fixture, the compact fluorescent lamp 10 is spaced from the ballast 14 relative to a plane parallel to the fixture engaging surface 25. As a result, the illumination potential of the light fixture using a compact fluorescent lamp is maximized, avoiding any illumination absorption by the ballast 14 or wires 15. In addition, this configuration enables better airflow throughout the fixture, thereby operating cooler and extending the life of the lamp.

The attachment member 20 is preferably formed of a UL approved plastic or an equivalent thereof. The angle incline of the attachment member 20 is preferably in the range of about 15°-60°. The incline of the attachment member 20 spaces at least a portion of the compact fluorescent lamp 10 from the ballast 14 relative to a plane parallel to the fixture engaging surface 25 as illustrated in FIG. 4.

While the invention has been described in detail with reference to preferred embodiments thereof, which are intended to be illustrative but not limiting, various changes may be made without departing from the spirit and scope of the invention, which is defined in the following claims.

What is claimed is:

1. An attachment member attachable to a compact fluorescent lamp socket housing a compact fluorescent lamp, said compact fluorescent lamp being coupled to a ballast, the attachment member comprising a fixture engaging surface and an inclined surface engageable with an attachment surface of said compact fluorescent lamp socket, said inclined surface being inclined at an angle such that at least a portion of said compact fluorescent lamp is spaced from said ballast relative to a plane parallel to said fixture engaging surface when said attachment member is attached to said compact fluorescent lamp socket, wherein said attachment surface of said compact fluorescent lamp socket comprises at least one first fixture engagement aperture adapted to receive first fixing means for fixing said compact fluorescent lamp socket to a fixture, said attachment member further comprising a corresponding at least one placement aperture adapted to receive said fixing means, said at least one placement aperture being delimited by a ridge extending in a plane substantially parallel to said inclined surface.

2. An attachment member according to claim 1, wherein said attachment surface of said compact fluorescent lamp socket further comprises at least one second fixture engagement aperture adapted to receive second fixing means for fixing said compact fluorescent lamp socket to said fixture, said attachment member further comprising a corresponding at least one placement post engageable with said at least one second fixture engagement aperture.

3. An attachment member according to claim 2, wherein said at least one placement post is disposed substantially perpendicular to said inclined surface.

4. An attachment member according to claim 2, comprising a first end at a beginning of said inclined surface and a second end at an end of said inclined surface, wherein said at least one placement aperture is disposed adjacent said first end and said at least one placement post is disposed adjacent said second end.

5. An attachment member according to claim 2, further comprising a pair of sidewalls defining said inclined surface and an endwall disposed substantially perpendicular to and connecting said sidewalls, said at least one placement post extending beyond said endwall at an angle substantially perpendicular to said inclined surface.

6. An attachment member according to claim 1, further comprising a pair of sidewalls defining said inclined surface and an endwall disposed substantially perpendicular to said sidewalls.

7. A light fixture including a main surface supporting a ballast and a lamp socket, said lamp socket housing a compact fluorescent lamp and comprising an attachment member disposed between said main surface and said lamp socket and having a fixture engaging surface engageable with said main surface and an inclined surface engageable with an attachment surface of said lamp socket, said inclined surface being inclined at an angle such that at least a portion of said compact fluorescent lamp is spaced from said ballast at an angle relative to a plane parallel to said fixture engaging surface.

8. A light fixture according to claim 7, wherein said attachment surface of said lamp socket comprises at least one first fixture engagement aperture adapted to receive first fixing means for fixing said lamp socket to said main surface of said fixture, said attachment member further comprising a corresponding at least one placement aperture aligned with said at least one first fixture engagement aperture and adapted to receive said fixing means.

9. A light fixture according to claim 8, wherein said attachment member is molded to said lamp socket.

10. A light fixture according to claim 8, wherein said attachment member is integral with said lamp socket.

11. A light fixture according to claim 8, wherein said attachment surface of said lamp socket further comprises at least one second fixture engagement aperture, said attachment member further comprising a corresponding at least one placement post engageable with said at least one second fixture engagement aperture.

12. A light fixture according to claim 11, wherein said at least one placement post is disposed substantially perpendicular to said inclined surface.

13. A light fixture member according to claim 11, comprising a first end at a beginning of said inclined surface and a second end at an end of said inclined surface, wherein said at least one placement aperture is disposed adjacent said first end and said at least one placement post is disposed adjacent said second end.

14. A light fixture according to claim 11, wherein said at least one placement aperture is delimited by a ridge extending in a plane substantially parallel to said inclined surface.

15. A method of improving illumination from a lamp fixture including a ballast coupled to a single-end access lamp socket housing a lamp, the lamp fixture comprising a main surface, the method comprising the step of inserting an attachment member having an inclined surface between said lamp socket and said main surface of said lamp fixture such that at least a portion of said lamp is spaced from said ballast at an angle relative to a plane parallel to said fixture engaging surface.

16. A light fixture having a main surface and comprising an attachment member attached to a compact fluorescent lamp socket housing a compact fluorescent lamp, said compact fluorescent lamp being coupled to a ballast, the attachment member comprising a fixture engaging surface engaged with said main surface and an inclined surface engaged with an attachment surface of said compact fluorescent lamp socket, said attachment member being disposed between said main surface and said compact fluorescent lamp socket, wherein said inclined surface is inclined at an angle such that at least portion of said compact fluorescent lamp is spaced from said ballast relative to a plane parallel to said fixture engaging surface.

* * * * *